*(12)* United States Patent
Drias

(10) Patent No.: US 12,513,162 B2
(45) Date of Patent: Dec. 30, 2025

(54) SELF-ADAPTIVE CYBERSECURITY FOR IIoT

(71) Applicant: Schneider Electric Systems USA, Inc., Foxborough, MA (US)

(72) Inventor: Zakarya Drias, Boston, MA (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 238 days.

(21) Appl. No.: 18/231,479

(22) Filed: Aug. 8, 2023

(65) Prior Publication Data

US 2025/0055857 A1 Feb. 13, 2025

(51) Int. Cl.
*H04L 9/40* (2022.01)

(52) U.S. Cl.
CPC ...... *H04L 63/1416* (2013.01); *H04L 63/1433* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 2012/0180133 A1* | 7/2012 | Al-Harbi | ............. | H04L 63/1433 726/25 |
| 2016/0234240 A1* | 8/2016 | Dietrich | ............. | H04L 63/1433 |
| 2019/0109872 A1* | 4/2019 | Dhakshinamoorthy | | ..................... G06F 21/577 |
| 2020/0250317 A1* | 8/2020 | Gourisetti | ............. | G06F 21/577 |
| 2021/0334386 A1* | 10/2021 | AlGhamdi | .......... | H04L 63/1433 |
| 2022/0180133 A1 | 6/2022 | Antunovic et al. | | |
| 2023/0308474 A1* | 9/2023 | Thompson | .......... | H04L 63/1433 |
| 2023/0388324 A1* | 11/2023 | Thompson | .......... | H04L 63/1425 |

(Continued)

FOREIGN PATENT DOCUMENTS

WO 2021028060 A1 2/2021

OTHER PUBLICATIONS

Zografopoulos et al., Cyber Physical Energy Systems Security: Threat Modeling, Risk Assessment, Resources, Metrics, and Case Studies, IEEE, vol. 9, dated Feb. 24, 2021, 44 pages.

(Continued)

*Primary Examiner* — Joseph P Hirl
*Assistant Examiner* — Hassan Saadoun
(74) *Attorney, Agent, or Firm* — Stinson LLP

(57) ABSTRACT

A self-adaptive security system for a control system executing a plurality of Industrial of Internet of Things (IIoT) applications. A security processor communicatively coupled to the control system assesses a current security posture of the control system and determines if the current security posture is within or outside an acceptable risk tolerance as a function of a current threat landscape affecting the control system. In response to determining the current security posture is outside the acceptable risk tolerance, the security processor executes a risk weighting model to determine a modified cybersecurity strategy and autonomously executes the modified cybersecurity strategy to improve the current security posture of the control system relative to changes in the current threat landscape. The security processor also executes a digital twin to simulate operations of the control system and assesses a potential impact of the modified cybersecurity strategy on the operations before executing it.

18 Claims, 2 Drawing Sheets

(56) References Cited

U.S. PATENT DOCUMENTS

2024/0163304 A1* 5/2024 Gupta .................. H04L 63/1416
2024/0340301 A1* 10/2024 Thompson .............. H04L 63/20

OTHER PUBLICATIONS

Alcaraz et al., "Digital Twin: A Comprehensive Surveys & Tutorials", vol. 24, No. 3. Third Quarter, 2022, 29 pages.
Extended European Search Report from EP Application No. 24192374.7, Nov. 28, 2024, 9 pages.

* cited by examiner

SELF-ADAPTIVE CYBERSECURITY FOR IIoT

BACKGROUND

With cyberattacks on process automation and industrial control systems on the rise, industry awareness and interest in security of the supply chain has grown tremendously. Unfortunately, users of such systems tend to behave in a reactive mode when it comes to facing cybersecurity threats to their operations. Conventional processes include manually determining if a current security posture is unacceptable and then manually determining what adjustments must be made to the cybersecurity strategy to mitigate the risk. One of the root causes for this reactive approach is the disconnect between detecting a cybersecurity risk and making the changes to the system that are necessary to adequately mitigate the risk. Such changes are static by nature (e.g., security policies, security controls, network segmentation, etc.).

SUMMARY

Aspects of the present disclosure provide dynamic security policy enforcement, including application of a security risk weighting model to determine what security controls should be deployed at which level. Before deploying changes to the security controls, aspects of the present disclosure further determining the impact of the changes to the process operations.

In an aspect, a self-adaptive security system for an industrial process is provided. The industrial process includes a control system coupled to a plurality of assets and the control system is configured to generate control signals for controlling the assets. The assets perform operations of the industrial process in response to the control signals. The self-adaptive security system comprises a security processor communicatively coupled to the control system and a memory communicatively coupled to the security processor. The memory stores computer-executable instructions that, when executed, configure the security processor for assessing a current security posture of the control system and determining if the current security posture is within or outside an acceptable risk tolerance as a function of a current threat landscape affecting the control system. In response to determining the current security posture is outside the acceptable risk tolerance as a function of the current threat landscape affecting the control system, the security system autonomously executes a modified cybersecurity strategy associated with the control system to improve the current security posture of the control system relative to changes in the current threat landscape.

In another aspect, a method of adaptively securing an industrial process includes assessing a current security posture of a control system of the industrial process and determining if the current security posture is within or outside an acceptable risk tolerance as a function of a current threat landscape affecting the control system. In response to determining the current security posture is outside the acceptable risk tolerance as a function of the current threat landscape affecting the control system, the method includes autonomously executing a modified cybersecurity strategy associated with the control system to improve the current security posture of the control system relative to changes in the current threat landscape.

In yet another aspect, a method provides a self-adaptive cybersecurity system for IIoT applications. The method comprises assessing a current threat landscape of a control system executing a plurality of IIoT applications, which include sensitive data. The method also includes assessing a current security posture of the control system and determining if the current security posture is within or outside an acceptable risk tolerance as a function of the current threat landscape affecting the control system. In response to determining the current security posture is outside the acceptable risk tolerance as a function of the current threat landscape affecting the control system, the method further comprises autonomously executing a modified cybersecurity strategy associated with the control system to improve the current security posture of the control system relative to changes in the current threat landscape.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
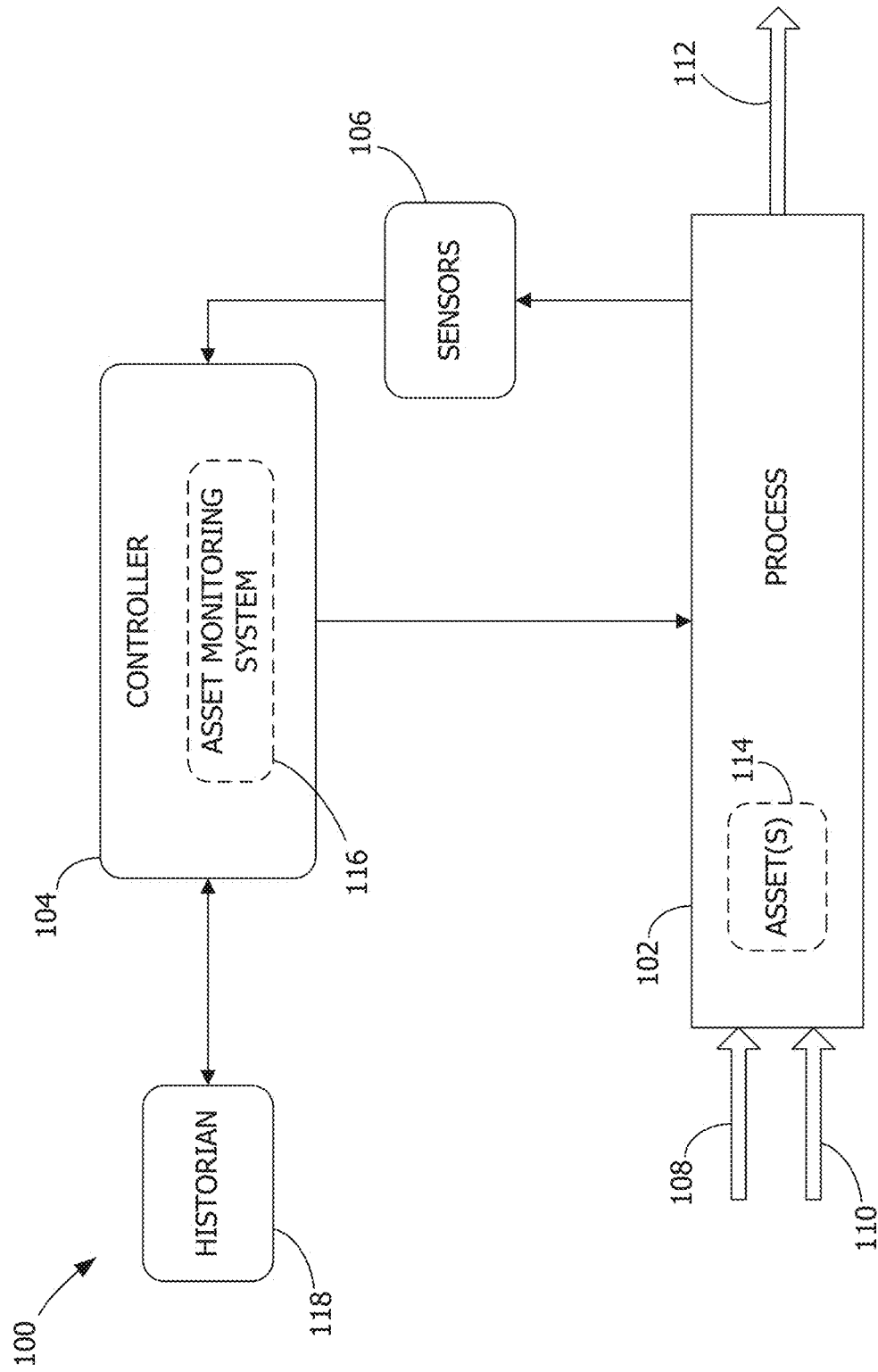
FIG. 1 is a block diagram illustrating a process control system according to an embodiment.

FIG. 1 displays the basic structure of an example process control system 100. In an embodiment, a process 102 is communicatively connected to a controller 104 and sensors 106. The process 102 has inputs 108 and 110 that comprise the necessary inputs for the process to create an output 112. In an embodiment, the input 108 includes energy for powering process 102 and input 110 includes physical or chemical raw materials for use in process 102. The output 112 comprises physical or chemical products from the process or produced energy in the form of electricity or the like.

The controller 104 sends data to process 102 in order to direct the operations of process 102 according to the goals of controller 104. The data sent comprises commands that operate various types of process elements, or assets 114, of the process, such as pumps, motors, valves, actuators, or the like. The assets 114 may be any mechanical, chemical, electrical, biological, or combined mechanism or set of mechanisms used to convert energy and materials into value added products or production. In an embodiment, the assets 114 are Industrial Internet of Things (IIoT) devices.

The sensors 106 of FIG. 1 monitor process 102 at various points and gather data from those points. The sensors 106 then send the data gathered to controller 104. Based on the gathered data, controller 104 can send additional commands to process 102. In this way, the system 100 forms a control feedback loop, where controller 104 reacts to changes in process 102 as observed by sensors 106. Different actions carried out by process 102 according to the commands of controller 104 may change the data being gathered by sensors 106, thus causing further adjustments by controller 104 in response to those changes. By implementing this control feedback loop, process 102 can be controlled by controller 104 in an efficient manner.

To ensure safe operation, controller 104 includes one or more condition or asset monitoring systems 116 responsive to sensors 106 for performing vibration analysis, motor current signature analysis, and the like on critical assets 114. In the illustrated embodiment, system 100 also includes a historian 118 configured to capture and store industrial data, including process, alarm, and event history data.

Figure 2:
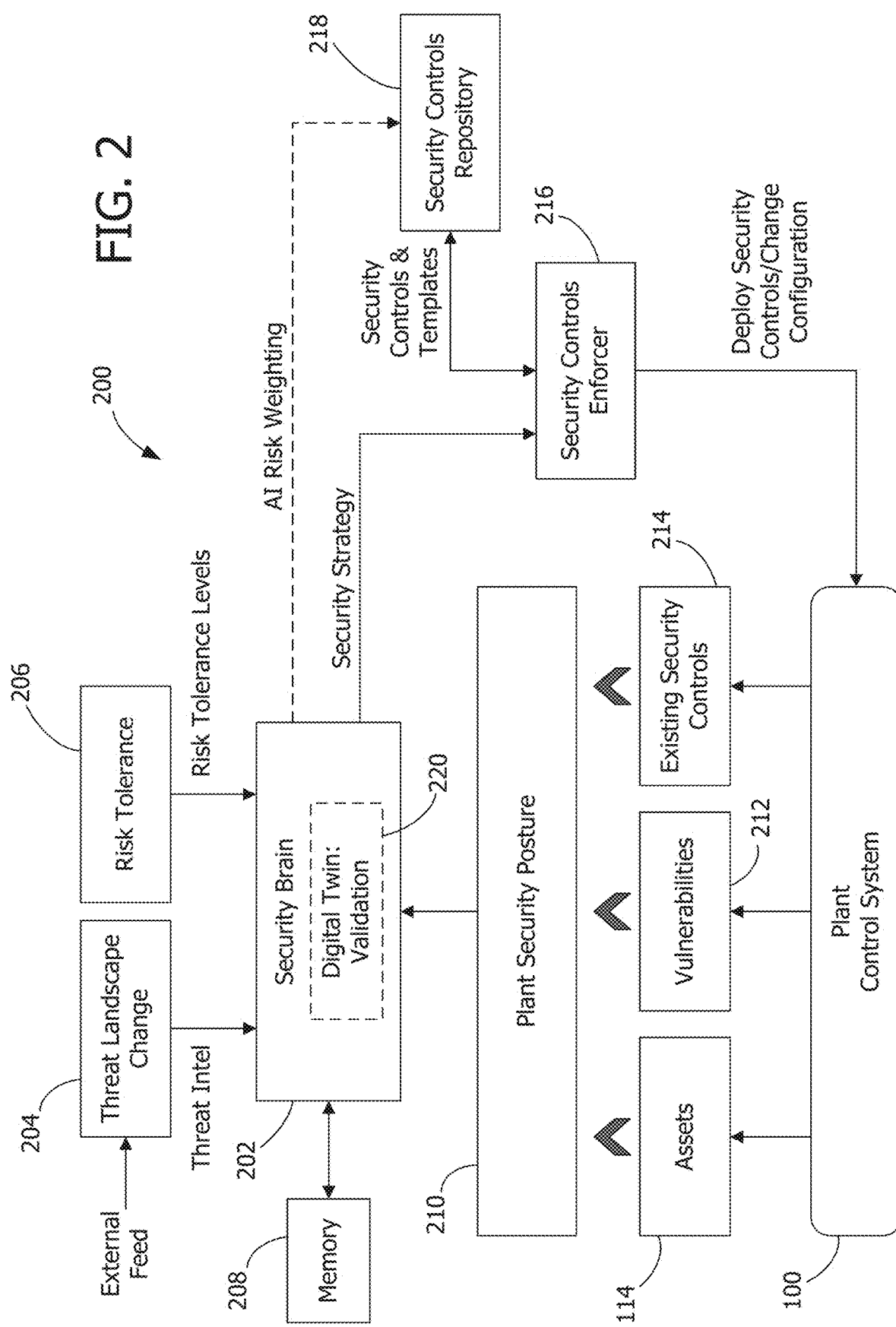
FIG. 2 illustrates a self-adaptive security system according to an embodiment.

Referring now to FIG. 2, a self-adaptive cybersecurity system 200 is shown for use in securing, for example, control system 100 operating in an industrial plant. The system 200 senses the security data in the plant and, based on changes in the security posture, automatically deploys security controls to lower the risk to an acceptable level. For example, a security posture may be built for a given process automation system that includes threats and vulnerabilities as well as the security controls currently in place. Based on a tolerated risk level by the user, system 200 makes the adequate changes to the security controls by changing or removing existing security controls and/or deploying additional or different security controls to lower the overall risk to an acceptable level. Those skilled in the art are familiar with security controls, which are defenses or countermeasures for detection of vulnerabilities and points of entry within a network, including scans for malware, phishing attempts, etc., prevention of cyber-attacks, reduction of cyber security risks, counteracting of cyber-attacks, and the like. Typical security controls include technical measures such as firewalls and administrative measures such as policies and access control.

At least one processor, referred to as a security brain 202, receives input relating to any changes in the threat landscape at 204 and information relating to a predefined risk tolerance at 206. A memory 208 stores computer-executable instructions that, when executed, configure the security processor 202 for self-adaptive cybersecurity of process control system 100 based at least in part on the threat landscape changes 204 and the risk tolerance 206. In an embodiment, an external feed provides threat landscape changes 204 and a user of the process automation system provides risk tolerance 206. The security brain 202 also senses the current security posture, i.e., the security data in the plant, at 210. As described above, the security posture 210 may be built for process control system 100 based on its assets 114, threats and vulnerabilities 212, and security controls 214 currently in place. The security brain 210 assesses the security posture 210 to determine the potential impact of threat landscape changes 204 in light of risk tolerance 206 and automatically generates a security strategy to address the potential impact.

To implement the strategy of security brain 202, a security controls enforcer 216 retrieves one or more tools, such as security controls and templates, from a security controls repository 218. In an embodiment, the security controls enforcer 216 comprises software executed by security brain 202 or another processor associated with control system 100. As shown in FIG. 2, security controls enforcer 216 automatically changes or removes existing security controls 214, deploys additional or different security controls retrieved from security controls repository 218, makes configuration changes, etc. as needed to implement the security strategy designed to lower the risk from threat landscape changes 204 to an acceptable level relative to risk tolerance 206.

In an embodiment, the security brain 202 of system 200 executes a digital twin 220 simulating operations of control system 100 in light of the current security posture 210. Before implementing a new security strategy based on the changing threat landscape, the digital twin 220 determines the potential impact of the changed security controls on process operations. In other words, digital twin 220 determines whether the benefit of reducing the risk by implementing the new security strategy outweighs the cost of negatively impacting operations through the security controls. If the potential impact is acceptable, the digital twin 220 validates the new security strategy and system 200 automatically deploys it to control system 100. In this manner, aspects of the present disclosure determine the capabilities of security posture 210 upfront based on the changes in the threat landscape 204 and, thus, provide an opportunity to determine what is needed to protect control system 100, including assets 114, from threats. This is a complex task complicated by the urgency of making the right decision at the right time. Advantageously, system 200 is configured to take the appropriate actions in terms of which security control(s) are needed and then deploy them automatically to control system 100 to ensure continuity of the operations.

According to further aspects of the present disclosure, security brain 202 executes one or more of statistical analyses, data mining, artificial intelligence, machine learning, deep learning, neural networks, parallel coordinate analyses, etc. to perform risk weighting and to predict the impact of a new security strategy on process operations. In an embodiment, security brain 202 uses one or more of these techniques to enrich the available security controls stored in repository 218.

Aspects of the present disclosure provide dynamic security policy enforcement, apply a security risk weighting model to determine what security control to deploy at which level, and determine the impact of security controls to process operations.

In operation, a method embodying aspects of the present disclosure provides a self-adaptive cybersecurity system for IIoT applications includes assessing a current threat landscape of process automation system including IIOT applications possessing sensitive data and assessing a current security posture of the system. The method also includes determining whether the current security posture is acceptable or within an acceptance range given the current threat landscape and, in response to determining the current security posture is not acceptable or not within the acceptance range given the current threat landscape, autonomously adjusting the cybersecurity strategy associated with the customer system (e.g., adding security controls, adjusting current controls, etc.) to improve the current security posture.

The method of providing a self-adaptive cybersecurity system for IIoT applications further comprises applying a security risk weighting model to determine what security controls to deploy at which level and/or determining impact of the security controls on process operations prior to making the changes to the security controls. In an embodiment, the changes to the security controls are selected based, at least in part, on the determined impact of the security controls on the process operations.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A self-adaptive security system for an industrial process, the industrial process including a control system coupled to a plurality of assets, wherein the control system is configured to generate control signals for controlling the assets, and wherein the assets perform operations of the industrial process in response to the control signals, the self-adaptive security system comprising:
  a security processor communicatively coupled to the control system; and
  a memory communicatively coupled to the security processor, the memory storing computer-executable instructions that, when executed, configure the security processor for:
    assessing a current security posture of the control system;
    determining if the current security posture is within or outside an acceptable risk tolerance as a function of a current threat landscape affecting the control system;
    in response to determining the current security posture is outside the acceptable risk tolerance as a function of the current threat landscape affecting the control system, determining a modified cybersecurity strategy associated with the control system to improve the current security posture of the control system relative to changes in the current threat landscape;

executing a digital twin to simulate operations of the control system under the modified cybersecurity strategy and to assess a potential impact of the modified cybersecurity strategy on the operations of the industrial process before executing the modified cybersecurity strategy; and autonomously executing the modified cybersecurity strategy.

2. The self-adaptive security system of claim 1, wherein the current security posture comprises one or more current security controls, and wherein executing the modified cybersecurity strategy includes one or more of the following: deploying an additional security control, adjusting at least one of the one or more current security controls, removing at least one of the one or more current security controls, and replacing at least one of the one or more current security controls with one or more new security controls.

3. The self-adaptive security system of claim 1, wherein the current security posture is based on the assets of the control system, existing security vulnerabilities associated with the control system, and security controls associated with the control system currently in effect.

4. The self-adaptive security system of claim 1, wherein the memory stores computer-executable instructions that, when executed, further configure the security processor for receiving input from an external feed relating to changes in cyberthreats and assessing the current threat landscape affecting the control system based on the received input.

5. The self-adaptive security system of claim 4, wherein the assets of the control system comprise Industrial Internet of Things (IIoT) devices, and wherein assessing the current threat landscape of the control system includes identifying IIoT applications having sensitive data.

6. The self-adaptive security system of claim 1, wherein the memory stores computer-executable instructions that, when executed, further configure the security processor for receiving input from a user relating to the acceptable risk tolerance.

7. The self-adaptive security system of claim 1, wherein the memory stores computer-executable instructions that, when executed, further configure the security processor for executing a security risk weighting model to determine the modified cybersecurity strategy.

8. The self-adaptive security system of claim 1, wherein the memory stores computer-executable instructions that, when executed, further configure the security processor for determining the modified cybersecurity strategy at least in part based on the assessed potential impact thereof on the operations of the industrial process.

9. A method of adaptively securing an industrial process, the industrial process including a control system coupled to a plurality of assets, wherein the control system is configured to generate control signals for controlling the assets, and wherein the assets perform operations of the industrial process in response to the control signals, the self-adaptive security system comprising:

assessing a current security posture of the control system;

determining if the current security posture is within or outside an acceptable risk tolerance as a function of a current threat landscape affecting the control system; and in response to determining the current security posture is outside the acceptable risk tolerance as a function of the current threat landscape affecting the control system, determining a modified cybersecurity strategy associated with the control system to improve the current security posture of the control system relative to changes in the current threat landscape;

executing a digital twin to simulate operations of the control system under the modified cybersecurity strategy and to assess a potential impact of the modified cybersecurity strategy on the operations of the industrial process before executing the modified cybersecurity strategy; and autonomously executing the modified cybersecurity strategy.

10. The method of claim 9, wherein the current security posture comprises one or more current security controls, and wherein executing the modified cybersecurity strategy includes one or more of the following: deploying an additional security control, adjusting at least one of the one or more current security controls, removing at least one of the one or more current security controls, and replacing at least one of the one or more current security controls with one or more new security controls.

11. The method of claim 9, wherein the current security posture is based on the assets of the control system, existing security vulnerabilities associated with the control system, and security controls associated with the control system currently in effect.

12. The method of claim 9, further comprising receiving input from an external feed relating to changes in cyberthreats and assessing the current threat landscape affecting the control system based on the received input.

13. The method of claim 12, wherein the assets of the control system comprise Industrial Internet of Things (IIoT) devices, and wherein assessing the current threat landscape of the control system includes identifying IIoT applications having sensitive data.

14. The method of claim 9, further comprising receiving input from a user relating to the acceptable risk tolerance.

15. The method of claim 9, further comprising executing a security risk weighting model to determine the modified cybersecurity strategy.

16. The method of claim 9, further comprising determining the modified cybersecurity strategy at least in part based on the assessed potential impact thereof on the operations of the industrial process.

17. A method for providing a self-adaptive cybersecurity system for Industrial Internet of Things (IIoT) applications, comprising:

assessing a current threat landscape of a control system, wherein the control system executes a plurality of IIoT applications, and wherein one or more of the IIoT applications include sensitive data;

assessing a current security posture of the control system;

determining if the current security posture is within or outside an acceptable risk tolerance as a function of the current threat landscape affecting the control system; and in response to determining the current security posture is outside the acceptable risk tolerance as a function of the current threat landscape affecting the control system, determining a modified cybersecurity strategy associated with the control system to improve the current security posture of the control system relative to changes in the current threat landscape;

executing a digital twin to simulate operations of the control system under the modified cybersecurity strategy and to assess a potential impact of the modified cybersecurity strategy on the operations of the industrial process before executing the modified cybersecurity strategy; and autonomously executing the modified cybersecurity strategy associated.

18. The method of claim 17, further comprising:
executing a security risk weighting model to determine the modified cybersecurity strategy.

* * * * *